3,385,847
DERIVATIVES OF 6-AMINOPENICILLANIC ACID
AND A PROCESS FOR THEIR PREPARATION
Hubert Vanderhaeghe, Saint-Gilles-Brussels, Michel Claesen, Heverlee, and Paul Van Dijck and Guido Parmentier, Louvain, Belgium, assignors to Recherche et Industrie Therapeutiques R.I.T., Genval, Belgium, a corporation of Belgium
No Drawing. Filed Oct. 10, 1961, Ser. No. 144,025
Claims priority, application Great Britain, Oct. 28, 1960, 37,082/60
4 Claims. (Cl. 260—239.1)

This invention relates to a novel process of the preparation of 6-aminopenicillanic acid derivatives of the following general structural formula:

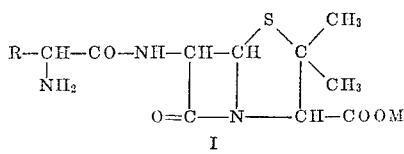

wherein

M is hydrogen or a non-toxic cation,
R is a lower alkyl, aryl or arylalkyl radical.

Preferably within the designation aryl are groups of the general formula:

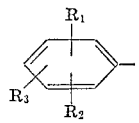

wherein each of $R_1$, $R_2$, and $R_3$ represent hydrogen, lower alkyl, lower alkoxy, sulfamyl, halogen, trifluoromethyl, or amino including dilower alkylamino, mono-lower alkylamino, alkanoylamino and lower alkanoyloxy.

The present invention is applicable to α-amino side chains of 6-carboxyamidopenicillanic acid derivatives, including for example the straight and branched chained alkyl groups from one to eight carbon atoms, heterocyclic groups and aryl groups, particularly benzyl. Thus for example in U.S. Patent No. 2,985,648 are described various α-aminobenzyl penicillins [alternatively named as 6-(α-aminophenylacetamido)-penicillanic acids or 6-(α-aminobenzylcarboxyamido) penicillins]. These compounds are described as being important antibacterial agents against both Gram-position and Gram-negative bacteria, and the present invention finds particular value in their preparation. According to the process therein described, the α-amino group of the benzyl side chain is protected during the acylation of 6-aminopenicillanic acid. This in turn requires the removal of this protecting group after acylation. As this entails hydrolysis of an amide linkage, degradation of the fragile penicillin nucleus poses a serious drawback to such a procedure.

By virtue of our invention, it is possible to obtain the 6-aminopenicillanic acid derivatives of the above Formula I without the necessity of subjecting the final compound to this hydrolysis step.

According to our process, the key α-azide intermediates of the formula:

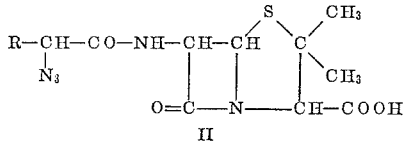

wherein R is as defined above are reduced to yield the corresponding α-amino Compound I. The conditions employed for this reduction are far milder than those required for hydrolysis of an amide, thereby significantly reducing the degree of degradation. The reduction is thus executed under sufficiently mild conditions to avoid destruction of the penicillin nucleus. Hence while by no means the only method, a highly advantageous method of reduction involves catalytic hydrogenation.

This process may thus be summarized as follows:

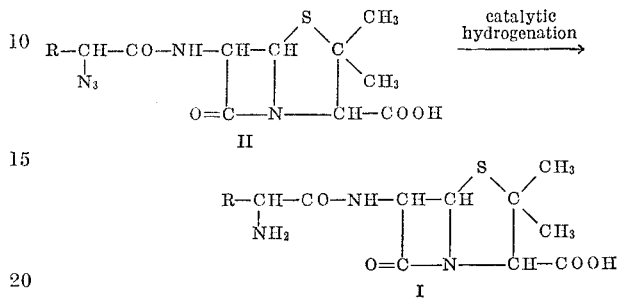

wherein R is as defined above.

Suitable catalysts for the above reduction include palladium-on-carbon, platinum, palladium black, palladium-on-barium sulfate, platinum oxide, rhodium, rhenium heptoxide, and the like. Of these, palladium-on-carbon has been found to be highly advantageous.

The reaction is generally executed in medium inert to the reduction conditions. Suitable solvents include for example water, lower alkyl alcohols such as ethanol, lower alkanoic acids such as acetic acid, ethers such as dioxane and the like.

While the reactions herein set forth are represented by compounds having a free carboxylic acid group on the 6-aminopenicillanic acid moiety, it is apparent that it is not only possible but indeed often desirable to employ a salt thereof. Such salts include amine salts such as the triethylamine salt, and inorganic salts such as the alkali metal salts; e.g., the sodium or potassium salts. Other typical salts well known to the art may obviously be employed but have been found to show little advantage over the above.

The requisite α-azidoalkyl or α-azidoarylalkyl penicillins of the general Formula II which are employed as starting materials are prepared by treating 6-aminopenicillanic acid with an acylating agent containing the appropriate α-azidocarboxymethylene group:

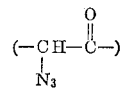

The actual acylating agent may be for example a halide of the corresponding α-azidocarboxylic acid, the reaction thus being as follows:

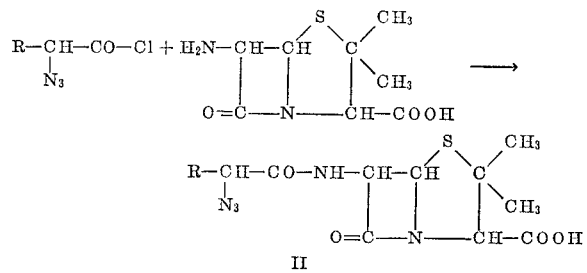

wherein R is as defined above.

Alternatively, the acylating agent is an acid anhydride or mixed anhydride of the corresponding α-azidocarboxylic acid. In the case of the mixed anhydride, this reagent may be a mixed anhydride of the particular α-azidocarboxylic acid and another carboxylic acid or a monoester of carbonic acid. When, for instance, a mixed anhydride of the monoethyl ester of carbonic acid is used, the reaction may be summarized as follows:

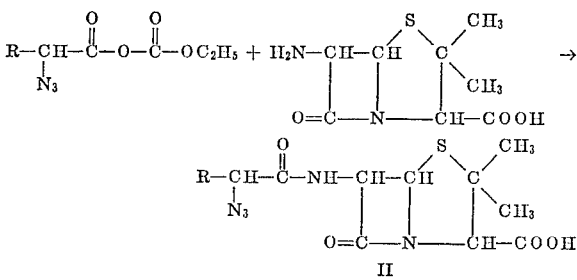

wherein R is as defined above.

In the above Formula I, the carbon atom to which the amino group is attached is an asymmetric carbon atom and the compounds can therefore exist in two optically active isomeric forms as well as in the optically active DL form. The epimers may be obtained either by employing optically active starting materials or by optical resolution of the DL form according to procedures well known to the art. Both forms are envisioned as being within the scope of the present invention.

Several of these α-azido penicillins have antibacterial activity in their right. This activity is demonstrated against various micro-organisms of both Gram negative and Gram positive.

The following examples will serve to illustrate the present invention. They do not constitute a limitation thereof, the invention being defined only by the appended claims.

EXAMPLE 1

6-aminopenicillanic acid (2.16 g.) is dissolved in a mixture of 20 ml. of an aqueous molar solution of potassium bicarbonate and 10 ml. of acetone. The obtained solution is cooled in an ice water bath and a solution of 1.8 g. of α-azidohexanoyl chloride in 10 ml. of acetone is slowly added with stirring, the pH being maintained between 7 and 8 by addition of molar solution of potassium bicarbonate. After addition of the reagent is complete, the reaction medium is stirred for 15 minutes at the ice bath temperature and then for another 2½-hour period at room temperature, the pH being maintained between 7 and 8 during this time. The solution is then extracted with ethyl ether and these extracts are thereafter discarded.

The extraction of the penicillanic acid derivative is carried out in two steps using successively 30 and 10 ml. of butyl acetate, the pH being adjusted to 2.5 with phosphoric acid previous to these extractions. The organic solution is thereafter successively washed twice with ice water, adjusted to pH 7, and re-extracted with an 0.5 normal aqueous sodium hydroxide solution. The aqueous layer is washed twice with ethyl ether and the remaining organic solvent is thereafter removed by evaporation under reduced pressure.

After freeze-drying of the solution, the amorphous mass is taken up in 18 ml. of butanol; by addition of ether, the sodium salt of α-azidopentyl penicillin is obtained.

This product inhibits *Micrococcus pyogenes* var. *aureus* (ATCC 6538P) at a concentration of 0.04 mcg./ml.; its stability after two hours at pH 2 is 81% the assays being performed according to the standard iodometric method.

EXAMPLE 2

Sodium salt of α-azidopentyl penicillin (2.650 g.), prepared as described in Example 1, is dissolved in 25 ml. of water. This solution is cooled at the ice water bath temperature, the pH adjusted to 2.5 with phosphoric acid, and the penicillanic acid derivative is extracted with one portion of 40 ml. of ether and two portions of 15 ml. of ether. The organic solutions are successively collected, washed with cold water and dried and the ether is thereafter evaporated under reduced pressure.

The residue is dissolved in 50 ml. of methanol and 7 ml. of normal acetic acid is then added. The hydrogenation is carried out in the presence of 2.5 g. of 5% palladium-on-charcoal for a period of 4½ hours. The catalyst is thereafter removed by filtration and washed well with a 1:1 methanol-water mixture; the methanolic solutions are collected and the solvent is evaporated under reduced pressure, maintaining a temperature below 25° C.

The aqueous residue is adjusted to pH 2.5 with hydrochloric acid and purified by 3 successive extractions using successively 25 ml. of butyl acetate, 10 ml. of butyl acetate and 10 ml. of ethyl ether, the organic extracts being discarded.

The organic solvent remaining in the aqueous phase is removed by evaporation under reduced pressure. The purified aqueous solution is then neutralized with aqueous sodium hydroxide and lyophilized to yield the sodium salt of α-aminopentyl penicillin.

In a similar fashion, other α-azido loweralkanoic acid chlorides are employed in this procedure to yield the corresponding α-amino lower alkyl 6-aminopenicillanic acid derivatives.

EXAMPLE 3

6-aminopenicillanic acid (5 g). is dissolved in a mixture of 30 ml. of acetone and 53 ml. of an aqueous molar solution of potassium bicarbonate. This solution is cooled to 0° C. and a solution of 4.65 g. of α-azidophenylacetyl chloride in 20 ml. of acetone is slowly added thereto, the pH being maintained between 7 and 8. After complete addition of the reagent, the reaction mixture is stirred for 15 minutes at 0° C. and then for 3 hours at room temperature. The acetone is extracted with ethyl ether which is thereafter discarded. The solution is extracted with butyl acetate and the two layers are separated. Butyl acetate (40 ml.) is then added to the iced aqueous solution and the pH is adjusted to 2.7 by addition of phosphoric acid. The aqueous solution is extracted twice with butyl acetate and the organic solutions then washed with water. The penicillin is re-extracted with a normal aqueous solution of potassium hydroxide and the aqueous layer washed twice with ether. After separation of the two layers, the organic solvent remaining in the aqueous phase is removed by evaporation under reduced pressure. After freeze-drying of the solution, the product is treated with acetone and ether, for giving the potassium salt of α-azidobenzyl penicillin.

This product inhibits *Micrococcus pyogenes* var. *aureus* (ATCC 6538P) and *Streptococcus haemolyticus* (ATCC 8668) at a concentration of 0.03 mcg./ml.

EXAMPLE 4

Triethylamine (21 g.) is added to a solution of 35.4 g. of α-azidophenylacetic acid in a mixture of 400 ml. of anhydrous dioxane and 100 ml. of acetone. The mixture is cooled to 0° C. and stirred for 15 minutes. There is then slowly added with stirring a solution of 21 g. of ethyl chloroformate in 50 ml. of anhydrous acetone. Upon completion of the addition, stirring is maintained for 15 minutes at 0° C. There is then slowly added thereto at the same temperature, 70 ml. of an aqueous solution of 43 g. of 6-aminopenicillanic acid and 22 g. of triethylamine. Stirring is then maintained for 10 minutes at the ice bath temperature and for 1½ hours at room temperature.

The solution is next diluted with 750 ml. of water, washed with ether, extracted at pH 2.5 with 350 ml. of butyl acetate and then extracted twice with 50 ml. each of butyl acetate. The combined butyl acetate extracts are washed with ice water and the pH adjusted to 7 by the addition of a normal potassium hydroxide solution. The organic layer is separated and discarded while the aqueous layer is concentrated by evaporation under reduced pressure to 100 ml. at a temperature below 30° C. Butanol (400 ml.) is then added to the residue and distillation of the mixture is carried out at a temperature below 35° C. This residue is then treated with acetone and ether, filtered, washed with ether and dried to yield the potassium salt of α-azidobenzyl penicillin.

EXAMPLE 5

The potassium salt of α-azidobenzyl penicillin (10 g.) is dissolved in 70 ml. of ice water and after acidification with phosphoric acid is extracted with 3×50 ml. of ether. The ethereal solution is washed, dried and evaporated at low temperature. The residue is then dissolved in a mixture of 190 ml. of methanol and 23 ml. of a normal aqueous solution of acetic acid, and the solution is shaken with 6 g. of 5% palladium-on-charcoal under a pressure of 3 atm. of hydrogen during 4½ hours. The catalyst is then removed by centrifugation and washed with 1:1 methanol-water. The methanol is evaporated under reduced pressure and after acidification to pH 2.5 (HCl), the remaining aqueous solution is extracted twice with 50 ml. of butyl acetate and once with 10 ml. of ether. The pH of the aqueous solution is then adjusted to 6.7 with an aqueous potassium hydroxide solution and the remaining organic solvent is removed by evaporation under reduced pressure. The solution is next lyophilized to yield potassium salt of α-aminobenzyl penicillin.

EXAMPLE 6

6-aminopenicillanic acid (5 g.) is dissolved in a mixture of 55 ml. of an aqueous molar solution of potassium bicarbonate and 30 ml. of acetone. This solution is cooled to 0° C. and a solution of 6 g. of α-azido-p-chlorophenylacetyl chloride in 20 ml. of acetone is slowly added thereto, the pH being adjusted between 7 and 8. After complete addition of the reagent, the reaction mixture is stirred during ¼ hour at 0° C. and during 3 hours at room temperature. The acetone is extracted with ethyl ether which is thereafter discarded. The solution is extracted with butyl acetate and the two layers are separated. Forty milliliters of butyl acetate are then added to the iced aqueous solution and the pH is adjusted to 2.7 by addition of phosphoric acid. The aqueous solution is then extracted twice with butyl acetate. The organic solutions are washed with water and the penicillin is re-extracted with a normal aqueous solution of potassium hydroxide. The aqueous layer is washed twice with ether and after separation of the two layers, the organic solvent remaining in the aqueous phase is removed by evaporation under reduced pressure. After freeze-drying the solution, the product is treated with acetone and ether, to yield the potassium salt of α-azido-p-chlorobenzyl penicillin.

EXAMPLE 7

The potassium salt of α-azido-p-chlorobenzyl penicillin (5 g.) is dissolved in 35 ml. of ice water, after acidified with phosphoric acid, and extracted three times with 25 ml. portions of ether. The ethereal solution is washed with water, dried and evaporated. The residue is then dissolved in a mixture of 100 ml. of methanol and 11 ml. of a normal aqueous solution of acetic acid and the solution is shaken in the presence of 3 g. of 5% palladium-on-carbon under a pressure of two atmospheres of hydrogen until the theoretical amount of hydrogen has been consumed. The catalyst is then removed by centrifugation and washed with methanol-water (1:1). The combined organic solutions are evaporated under reduced pressure and acidified to pH 2.5 with hydrochloric acid. The remaining aqueous solution is then extracted twice with 10 ml. of butyl acetate and once with 5 ml. of ether. The aqueous solution is then neutralized with aqueous sodium hydroxide and the remaining organic solvent is removed by evaporation under reduced pressure. The solution is finally lyophilized to yield the sodium salt of α-amino-p-chlorobenzyl penicillin.

EXAMPLE 8

6-aminopenicillanic acid (2.16 g.) is dissolved in a mixture of 20 ml. of an aqueous molar solution of potassium bicarbonate and 10 ml. of acetone. This solution is cooled in an ice water bath and a solution of 2.5 g. of α-azido-p-methoxyphenylacetyl chloride in 5 ml. of acetone is slowly added thereto with stirring, the pH being adjusted to between 7 and 8 by addition of a molar solution of potassium bicarbonate. After complete addition of the reagent, the reaction medium is maintained for ¼ hour at the iced bath temperature and for another 2½-hour period at room temperature, the pH being maintained between 7 and 8 during this time. The acetone is extracted with ethyl ether which is thereafter discarded.

The extraction of the penicillanic acid derivative is carried out in two steps using successively 30 ml. and 10 ml. of butyl acetate, the pH having been adjusted to 2.5 with phosphoric acid. The organic solution is thereafter successively washed twice with ice water and re-extracted at pH 7 with 0.5 normal aqueous sodium hydroxide solution. The aqueous layer is washed twice with ethyl ether and the remaining organic solvent is thereafter removed by evaporation under reduced pressure.

After freeze-drying of the solution, the amorphous mass is taken up in butanol. Upon the addition of ether, the sodium salt of α-azido-p-methoxybenzyl penicillin is formed.

EXAMPLE 9

The sodium salt of α-azido-p-methoxybenzyl penicillin (5 g.) is dissolved in 35 ml. of ice water and extracted with 3×10 ml. of ether after acidification with phosphoric acid. The ethereal solution is washed, dried and evaporated at low temperature. The residue is then dissolved in 100 ml. of dioxane and the solution is shaken in the presence of 3 g. of 5% palladium-on-charcoal under a pressure of 5 atm. of hydrogen during 4½ hours. The catalyst is then removed by centrifugation and washed with methanol-water (1:1). The methanol is evaporated under reduced pressure, and after acidification to pH 2.5 (HCl), the remaining aqueous solution is extracted twice with 10 ml. portions of butyl acetate and once with a 5 ml. portion of ether. The solution is then neutralized (pH 6.7) with aqueous potassium hydroxide. The remaining organic solvent is removed by evaporation under reduced pressure. The solution is then lyophilized to yield the potassium salt of α-amino-p-methoxybenzyl penicillin.

EXAMPLE 10

The requisite α-azido acids employed as starting materials in the above examples may be prepared according to the method described by W. F. Huber, JACS 77, 112 (113) 1955. This method involves the treatment of an α-halogenocarboxylic acid ester with sodium azide and subsequent saponification of the resultant α-azidocarboxylic acid ester. Accordingly, compounds such as α-bromobutyric acid, α-bromoisovaleric acid, α-bromo - β - phenylpropionic acid and α-bromo-t-butylacetic acid, may be converted to the corresponding α-azidocarboxylic acids, thence to the corresponding α-azidocarboxamidopenicillanic acid derivatives and finally reduced to the α-amino-6-carboxyamidopenicillanic acid derivatives.

We claim:

1. In the process for the preparation of compounds having the formula:

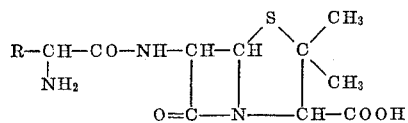

wherein R is alkyl from 1 to 8 carbon atoms inclusively, the step which comprises hydrogenating with a palladium-on-carbon, platinum, palladium black, palladium-on-barium sulfate, platinum oxide, rhodium or rhenium heptoxide catalyst a compound of the formula:

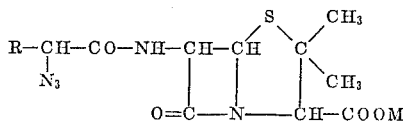

wherein R is as defined above and M is hydrogen, an amine cation or an alkali metal cation.

2. The process according to claim 1 wherein the catalyst is palladium-on-carbon.

3. A compound of the formula:

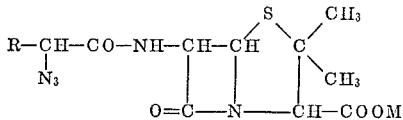

wherein R is alkyl from 1 to 8 carbon atoms and M is hydrogen, an amine cation or an alkali metal cation.

4. α-Azidopentylpenicillin.

References Cited
UNITED STATES PATENTS

| | | | |
|---|---|---|---|
| 2,985,648 | 5/1961 | Doyle et al. | 260—239.1 |
| 3,080,356 | 3/1963 | Catlin et al. | 260—239.1 |
| 3,228,930 | 1/1966 | Sjoberg et al. | 260—239.1 |

OTHER REFERENCES

Boyer et al., Chemical Reviews, vol. 54, No. 1, pp. 38–45 (1954).

NICHOLAS S. RIZZO, *Primary Examiner.*

W. A. MODANCE, D. McCUTCHEON, I. MARCUS, H. R. JILES, *Examiners.*

J. W. ADAMS, *Assistant Examiner.*